United States Patent
Bock et al.

(10) Patent No.: US 11,248,669 B2
(45) Date of Patent: Feb. 15, 2022

(54) BRAKE DUST PARTICLE FILTER AND DISC BRAKE ASSEMBLY COMPRISING A BRAKE DUST PARTICLE FILTER

(71) Applicant: MANN+HUMMEL GmbH, Ludwigsburg (DE)

(72) Inventors: Lukas Bock, Bietigheim-Bissingen (DE); Thomas Jessberger, Asperg (DE); Volker Kuemmerling, Bietigheim-Bissingen (DE); Robert Zbiral, Marbach (DE); Coskun Evlekli, Waiblingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 95 days.

(21) Appl. No.: 16/811,266

(22) Filed: Mar. 6, 2020

(65) Prior Publication Data
US 2020/0271176 A1    Aug. 27, 2020

Related U.S. Application Data

(63) Continuation of application No. PCT/EP2018/073612, filed on Sep. 3, 2018.

(30) Foreign Application Priority Data

Sep. 8, 2017 (DE) .................. 10 2017 008 423.8

(51) Int. Cl.
*F16D 65/00* (2006.01)
*F16D 55/225* (2006.01)
(Continued)

(52) U.S. Cl.
CPC ....... *F16D 65/0031* (2013.01); *F16D 55/225* (2013.01); *F16D 65/02* (2013.01); *F16D 2055/005* (2013.01); *F16D 2065/1392* (2013.01)

(58) Field of Classification Search
CPC .............. F16D 65/0031; F16D 55/225; F16D 2065/1392; F16D 65/02; F16D 55/22;
(Continued)

(56) References Cited

U.S. PATENT DOCUMENTS

2005/0016798 A1   1/2005 Sabelstrom et al.
2010/0096226 A1   4/2010 Gelb
(Continued)

FOREIGN PATENT DOCUMENTS

DE            1019190 B    11/1957
DE      102006051972 A1 *  8/2008
(Continued)

*Primary Examiner* — Pamela Rodriguez

(57) ABSTRACT

A brake dust particle filter for a disc brake assembly with brake disc and brake caliper has a ring segment-shaped housing accommodating the brake disc in the interior. The housing has first and second axially spaced apart housing sidewalls and a housing peripheral wall extending radially outwardly in circumferential direction and arranged between the first and second housing sidewalls. A first housing part includes the first and/or second housing sidewall such that the first and/or second housing sidewall is positionable axially displaced to the brake disc. A second housing part includes at least the housing peripheral wall. First and second housing parts are connected by a pivot mechanism having a pivot axis extending parallel to an axis of rotation of the brake disc. Due to the pivot mechanism, the housing peripheral wall is pivotable relative to the first housing part while the first and/or second housing sidewall remains stationary.

25 Claims, 7 Drawing Sheets

(51) Int. Cl.
*F16D 65/02* (2006.01)
*F16D 55/00* (2006.01)

(58) Field of Classification Search
CPC ....... F16D 2055/0037; F16D 2055/005; B01D 46/0046; B01D 46/0002; B01D 46/106
See application file for complete search history.

(56) References Cited

U.S. PATENT DOCUMENTS

| 2014/0054119 A1* | 2/2014 | Hummel | F16D 65/0031 |
| | | | 188/218 A |
| 2014/0054121 A1* | 2/2014 | Hummel | F16D 65/0031 |
| | | | 188/218 A |
| 2014/0076673 A1* | 3/2014 | Tsiberidis | F16D 55/22 |
| | | | 188/73.1 |

FOREIGN PATENT DOCUMENTS

| DE | 102012016835 A1 | | 5/2014 |
| DE | 102016108793 A1 | * | 11/2017 |
| JP | 2008196684 A | | 8/2008 |
| WO | 2012095273 A1 | | 7/2012 |

* cited by examiner

BRAKE DUST PARTICLE FILTER AND DISC BRAKE ASSEMBLY COMPRISING A BRAKE DUST PARTICLE FILTER

CROSS-REFERENCE TO RELATED APPLICATIONS

This application is a continuation application of international application No. PCT/EP2018/073612 having an international filing date of 3 Sep. 2018 and designating the United States, the international application claiming a priority date of 8 Sep. 2017 based on prior filed German patent application No. 10 2017 008 423.8, the entire contents of the aforesaid international application and the aforesaid German patent application being incorporated herein by reference.

BACKGROUND OF THE INVENTION

The invention concerns a brake dust filter for a disc brake assembly with a brake disc and a brake caliper. The brake dust particle filter is configured for catching particles that are produced when braking. The invention concerns moreover a disc brake assembly with such a brake dust particle filter.

It is known to catch and dispose of particles that are produced by brake abrasion by means of a brake dust particle filter. Such particles are produced by friction between brake pad and brake disc of a disc brake. Such a brake dust particle filter has become known, for example, from DE 10 2012 016 835 A1. This brake dust particle filter however requires an integration in a brake caliper housing and is suitable therefore only to a limited extent as a retrofitting solution. There it is provided to hold a shaped filter element in a receiving space that is embodied by the brake caliper housing wherein the shaped filter element engages about the brake disc in a U-shape.

SUMMARY OF THE INVENTION

In contrast to this, it is the object of the present invention to provide a brake dust particle filter that is embodied in a simple construction and is significantly easier to mount. Object of the present invention is furthermore to provide a disc brake assembly with such a brake dust particle filter.

The brake dust particle filter according to the invention is suitable for any applications of disc brakes, mobile as well as stationary applications. In mobile applications, it can be employed, for example, in passenger cars, trucks, buses rail vehicles. Stationary, for example, in shaft brakes as they are used in wind power devices.

The object is solved by a brake dust particle filter of the afore mentioned kind that, in accordance with the invention, comprises a ring segment-shaped housing configured to accommodate in the mounted state at least partially the brake disc in a housing interior, wherein the housing comprises a first housing sidewall and a second housing sidewall that are axially spaced apart from each other and the housing comprises a housing peripheral wall extending radially outwardly in circumferential direction which is arranged or embodied between the housing sidewalls in a mounted state, wherein the housing comprises the following:

- a first housing part comprising the first and/or second housing sidewall so that the housing sidewalls can be arranged axially displaced relative to the brake disc;
- a second housing part that comprises at least the housing peripheral wall;

wherein the first housing part and the second housing part are connected to each other by a pivot mechanism whose pivot axis extends parallel to an axis of rotation of the brake disc in a mounted state so that the housing peripheral wall is pivotable relative to the first housing part with the stationarily remaining first and/or second housing sidewall.

The object is further solved by a disc brake assembly comprising a brake disc, a brake caliper, and a brake dust particle filter according to the invention.

The dependent claims provide preferred further embodiments.

The brake dust particle filter comprises a ring segment-shaped, approximately banana-shaped and/or helmet-shaped housing. In the housing, the brake disc of a disc brake assembly is received in a mounted state. The housing comprises two housing sidewalls and a housing peripheral wall. The housing peripheral wall preferably connects in the mounted state of the brake dust particle filter the two housing sidewalls indirectly or directly. In the interior of the housing, i.e., facing the brake disc, the brake dust particle filter comprises a filter medium. The housing comprises a first housing part and a second housing part. In this context, the first housing part comprises the first and/or second housing sidewall and the second housing part comprises at least the housing peripheral wall. The first housing part is connected with the second housing part by a pivot mechanism.

The division or separability of the housing enables a significantly easier manufacture of the brake dust particle filter and facilitates servicing.

The pivot axis of the pivot mechanism extends according to the invention parallel to an axis of rotation of the brake disc in a mounted state so that the housing peripheral wall is pivotable relative to the stationarily remaining first and/or second housing sidewall.

The pivoting ability of both housing parts simplifies an exchange of the filter medium in a service situation significantly. Moreover, the selection of the pivot axis according to the invention provides advantages relative to a pivot axis which extends in radial direction relative to the brake disc: In particular, it is distinguished by improved safety. Should the pivotable second housing part which comprises the housing peripheral wall accidentally release and swing open during travel, it will come into contact with a rim well, which is noticed by the driver so that the latter can stop safely in order to repair the damage.

On the other hand, in a variant with a pivot axis that is extending in radial direction, in case of an accidental release of the pivotable housing part there is the threat that it catches between moving rim parts (spokes, through openings and the like) which may lead to devastating defects, in the worst case to a complete destruction of the wheel brake and/or blocking of the respective wheel.

A further advantage of the selection of the pivot axis according to the invention resides in that, after opening of the housing by pivoting of the housing part with the housing peripheral wall, not only the filter medium is easily accessible but the brake pads can be exchanged also without the brake dust particle filter having to be removed in an embodiment of the brake dust particle filter according to which the housing peripheral wall at least partially covers a brake caliper in radial outward direction.

In a particularly preferred embodiment, the pivot axis can be present at an end of the housing which, in the mounted state, is facing a brake caliper of the disc brake assembly so that the pivot mechanism can be opened opposite to a predefined forward travel rotational direction of the disc brake assembly. This improves the operational safety even more because a risk of jamming of the pivotable housing part at a rim well is reduced.

Particularly preferred, the first housing part and the second housing part are connectable in a reversibly detachable way. Advantageously, according to this embodiment the filter medium is inserted already prior to connecting the housing parts so that at least the pre-assembly process is simplified, even though the exchange of the filter medium in service is not. However, it is conceivable in this case that in the service situation the entire brake dust filter (including housing+filter medium) is exchanged in order to subject it to refurbishing, for example.

The housing peripheral wall can be part of the first housing sidewall and/or of the second housing sidewall.

The housing peripheral wall can be at least partially formed of housing parts that overlap each other.

In a particularly preferred embodiment of the invention, a first housing part comprises a splash guard, in particular in the form of a splash guard plate. In this way, an additional splash guard plate is not required so that weight can be saved, which provides driving-dynamic advantages as a result of an arrangement in the unsprung region of a chassis.

For connecting the two housing parts, for example, in an end position of the pivot mechanism, furthermore a screw connection can be provided. Alternatively or additionally, the first housing part and the second housing part can also be connected to each other by a clip connection.

In order to enlarge the effective filter surface of the filter medium, a tongue that supports the filter medium can be provided in the brake dust particle filter. The tongue is covered with the filter medium at least partially, preferably as much as possible, particularly preferred completely. In this way, a significantly higher filtering effect than in the prior art is achieved.

The tongue can be arranged or embodied at a housing wall. Preferably, the tongue is arranged or embodied at the housing peripheral wall. Alternatively or additionally, the brake dust particle filter can comprise a filter element wherein the filter element comprises a filter element support structure on or at which the filter medium is arranged. In this context, the filter element support structure can comprise the tongue. When providing a filter element, the filter medium is exchangeable particularly easily and environmentally friendly because upon loading of the filter medium only the filter element must be exchanged and not the complete housing. For receiving the filter element, according to this embodiment a receiving region is advantageously provided into which the filter element can be inserted. In the receiving region, it can be held, for example, by clips or other fastening elements that appear suitable. Particularly advantageously, the filter element has a curved shape, in particular a circular arc shape which corresponds with the inner shape or the radius of the housing peripheral wall.

The tongue extends in this context preferably from an outer circumference to an inner circumference, i.e., in radial inward direction.

The filter medium can be fastened indirectly or directly to the tongue, to the housing wall, in particular to the housing peripheral wall, and/or to the filter element support structure. The filter medium can form a fold into which the tongue extends at least partially. In this way, the brake dust particle filter can be manufactured particularly easily.

The tongue can comprise at least one through opening which is covered by the filter medium. In this way, the filter medium can be flowed through in the region of the tongue.

The tongue can advantageously comprise a plurality of through openings which are each covered by the filter medium.

In a further preferred embodiment of the invention, in the region of the tongue the filter medium is embodied in the form of a collecting pocket or catching pocket for particles wherein the catching pocket is closed in downward direction so that particles cannot fall out of the catching pocket due to the gravity acting on them. The brake dust particle filter can retain in this way large particle quantities. The shape of the collecting or catching pocket can advantageously be imparted to the filter medium by the at least one tongue which can have just such a shape. Preferably, a lowest point of the pocket is pointing downwardly in the direction of gravity.

In a further preferred embodiment of the brake dust particle filter, the filter medium comprises at least a first filter layer with a porosity and a second filter layer with a larger porosity. The two filter layers can be embodied in the form of regions (viewed in the direction of thickness) of the filter medium so that the filter medium has a porosity gradient. Alternatively or additionally thereto, an additional filter medium can be provided on the filter medium, wherein the porosity of the additional filter medium differs preferably from the porosity of the filter medium. Due to this arrangement or configuration of different filter layers, the degree of separation of the brake dust particle filter can be matched precisely to the respective application. Advantageously, the pore size in this context decreases in radial direction from the interior to the exterior.

The brake dust particle filter can comprise in addition to the afore described tongue at least one additional tongue in the housing interior. In other words, the brake dust particle filter comprises preferably a plurality of tongues that are projecting inwardly in the housing interior and are preferably arranged spaced apart in circumferential direction. The tongues support the filter medium and are covered at least partially, in particular completely, by the filter medium. By the arrangement or configuration of a plurality of tongues, the filter action is further significantly increased. At least two tongues can be positioned in this context at a different angle relative to the housing peripheral wall, respectively. Angle relative to the housing peripheral wall is understood here as an angle between a tangent, placed at an imaginary contact point of the tongue at the housing peripheral wall, and the length extension of the tongue.

The brake dust particle filter is preferably designed such that the filtering action increases in circumferential direction of the housing. The increase is realized in this context preferably away from a bearing region of the housing, wherein the bearing region is provided for bearing against the brake caliper of the disc brake assembly. In other words, the brake dust particle filter is preferably embodied such that the filter action increases with increasing distance from the brake caliper or from the bearing region for bearing against the brake caliper. A better filter action is understood herein, for example, as the ability of separating finer particle fractions. This is realized in particular by one or a plurality of the following measures:

- The porosity of the filter medium decreases in circumferential direction of the housing. In particular, the filter medium comprises a larger porosity at a tongue than the filter medium at the next neighboring tongue which is located farther away from the bearing region of the brake dust particle filter.
- The thickness of the filter medium increases in circumferential direction of the housing.

A tongue is positioned at a smaller angle relative to the housing peripheral wall than a neighboring tongue that is located farther away from the bearing region.

A tongue comprises more and/or larger through openings than a neighboring tongue which is located farther away from the bearing region of the brake dust particle filter, wherein preferably the dimensions of the through openings decrease in circumferential direction away from the bearing region.

A tongue with its free end projects less far into the interior of the housing than a neighboring tongue that is located farther away from the bearing region of the brake dust particle filter.

The surface of a tongue is smaller than the surface of a neighboring tongue that is located farther away from the bearing region of the brake dust particle filter.

The brake dust particle filter can comprise at least one opening for the discharge of filtered air in the housing wall, in particular in the housing peripheral wall. Preferably, the brake dust particle filter comprises a plurality of openings for the discharge of filtered air in the housing wall, in particular in the housing peripheral wall. In combination with a detachable connection of the housing parts, in particular of the housing peripheral wall, this results in the advantage that in the service situation, as needed, a housing peripheral wall with larger/smaller or differently shaped openings can be inserted, while maintaining the further housing components, in order to fulfill cooling air requirements in a tailored fashion.

At least one opening is provided preferably in a housing end region which—viewed in circumferential direction of the housing—is embodied in the region of the brake caliper. The housing end region bridges preferably at least a radially outwardly open region of the brake caliper because, there, a high brake dust discharge occurs typically that, in addition to the brake abrasion that leaves the brake caliper in tangential direction, constitutes the greatest emission source. Preferably, the filter medium is a continuous material strip which extends across the plurality of inwardly positioned tongues as well as across the inner side of the housing peripheral wall in the housing end region.

In order to prevent that air is pressed by the back pressure during driving against the filtration direction through the filter medium, at least one outwardly projecting rib can be arranged or embodied at the housing wall, in particular at the housing peripheral wall. Preferably, a plurality of outwardly projecting ribs are provided at the housing wall, in particular at the housing peripheral wall. The at least one outwardly projecting rib can be provided preferably in the region of the at least one opening so that the rib covers the respective opening in the traveling direction at least partially so that a dynamic pressure produced by driving does not act on the opening. Preferably, a plurality of outwardly projecting ribs are provided respectively in the region of an opening for discharge of filtered air, preferably each one of the openings is provided with an afore described rib.

The filter medium is preferably configured such that, even at a temperature of more than 600° C., it is stable in order to be able to withstand the temperatures in immediate environment of a disc brake. In this context, the filter medium can comprise a metal, a metal fiber nonwoven, glass, ceramic and/or a high temperature-resistant plastic material, in particular polyether ether ketone. However, the housing should comprise also advantageously a sufficient temperature resistance; for this purpose, it can be embodied of sheet metal, preferably sheet steel. In addition to the excellent temperature resistance, sheet steel has the further advantage that the housing can be obtained by a simple deformation process, for example, by deep drawing.

The ring segment-shaped housing covers preferably a large angle range of the brake disc in order to obtain a high filtration action. The housing extends in this context preferably about a ring segment angle of more than 45°, in particular of more than 75°, particularly preferred of more than 90°. When selecting a suitable enclosing angle, there is a conflict of objectives to be solved between the proportion of particles to be filtered and the cooling performance that can be made available to the disc brake.

Particularly preferred, the first housing part comprises at least one inwardly projecting tongue and the second housing part comprises at least one opening. Further preferred, all inwardly projecting tongues are provided at the first housing part and all openings at the second housing part. The separate configuration of tongue(s) and opening(s) facilitates significantly the production of the brake dust particle filter because the openings, optionally with corresponding ribs, as well as the inwardly positioned tongues can be produced by punching.

The object according to the invention is furthermore solved by a disc brake assembly with a brake disc, a brake caliper, and a brake dust particle filter as described above.

The brake dust particle filter can have a stationary position relative to the brake caliper, a wheel bearing housing and/or a splash guard. Alternatively or additionally thereto, the brake dust particle filter can be fastened to the brake caliper, to a wheel bearing housing and/or to a splash guard, wherein an attachment at the brake caliper can be advantageously provided when a so-called stationary caliper is concerned. Particularly advantageously, the brake dust particle filter can be connected to the wheel bearing housing at the same fastening points as the brake caliper. Moreover, the screws with which the brake caliper is screwed to the wheel bearing housing can comprise at least in the region of a screw head a blind bore thread so that the brake dust particle filter is connectable with the screws so that advantageously the safety-critical screw connection of the brake caliper (holder) with the wheel bearing housing is not affected (settling/pretension force change). Such an arrangement is suitable to be retrofitted without problem at existing disc brake assemblies because such screw-connecting points are already existing.

In a particularly preferred embodiment of the invention, one housing part of the brake dust particle filter can be a splash guard element, in particular splash guard plate, that, positioned inwardly, covers the brake disc at least partially. In this way, an additional splash guard plate is not required so that weight can be saved, which provides driving-dynamic advantages as a result of an arrangement in the unsprung region of a chassis.

In order to effect a particularly effective particle separation, the brake dust particle filter is preferably arranged so as to immediately adjoin the brake caliper. The brake dust particle filter in this context is arranged preferably downstream of the brake caliper, wherein in this context the term Adownstream@ relates to the rotational direction of the brake disc for an intended forward travel of the vehicle at which the disc brake assembly is provided.

The brake dust particle filter covers preferably at least partially an outer side of the brake caliper, particularly preferred a circumferential outer side of the brake caliper. The coverage of the brake caliper is realized in this context preferably with the housing end region. Particularly preferred, the brake caliper is covered completely in the region of the circumferential outer side, at which often openings for cooling air supply and/or service (removal of the friction pads) are located, at least however in the region of the openings, by the housing end region of the brake dust particle filter so that no unfiltered outflow occurs in this region, but particle-laden air that exits from there first flows through the filter medium and subsequently through the opening in the housing peripheral wall into the environment.

In a further preferred embodiment of the disc brake assembly, the at least one inwardly projecting tongue with its free end is oriented toward the brake caliper. Preferably, a plurality, in particular all, tongues are oriented with their respective free ends toward the brake caliper. In this way, the filter efficiency can be further increased because brake dust particles that are entrained tangentially by the rotation essentially can all be caught by the shape of the tongues.

Further features and advantages of the invention result from the following description of several embodiments of the invention, from the claims as well as the Figures which show invention-relevant details. The features illustrated in the Figures are illustrated such that the particularities of the invention can be made visible clearly. The different features can be realized individually or several thereof combined in any combinations in variants of the invention and are therefore combinable with each other.

DESCRIPTION OF PREFERRED EMBODIMENTS

Figure 1:
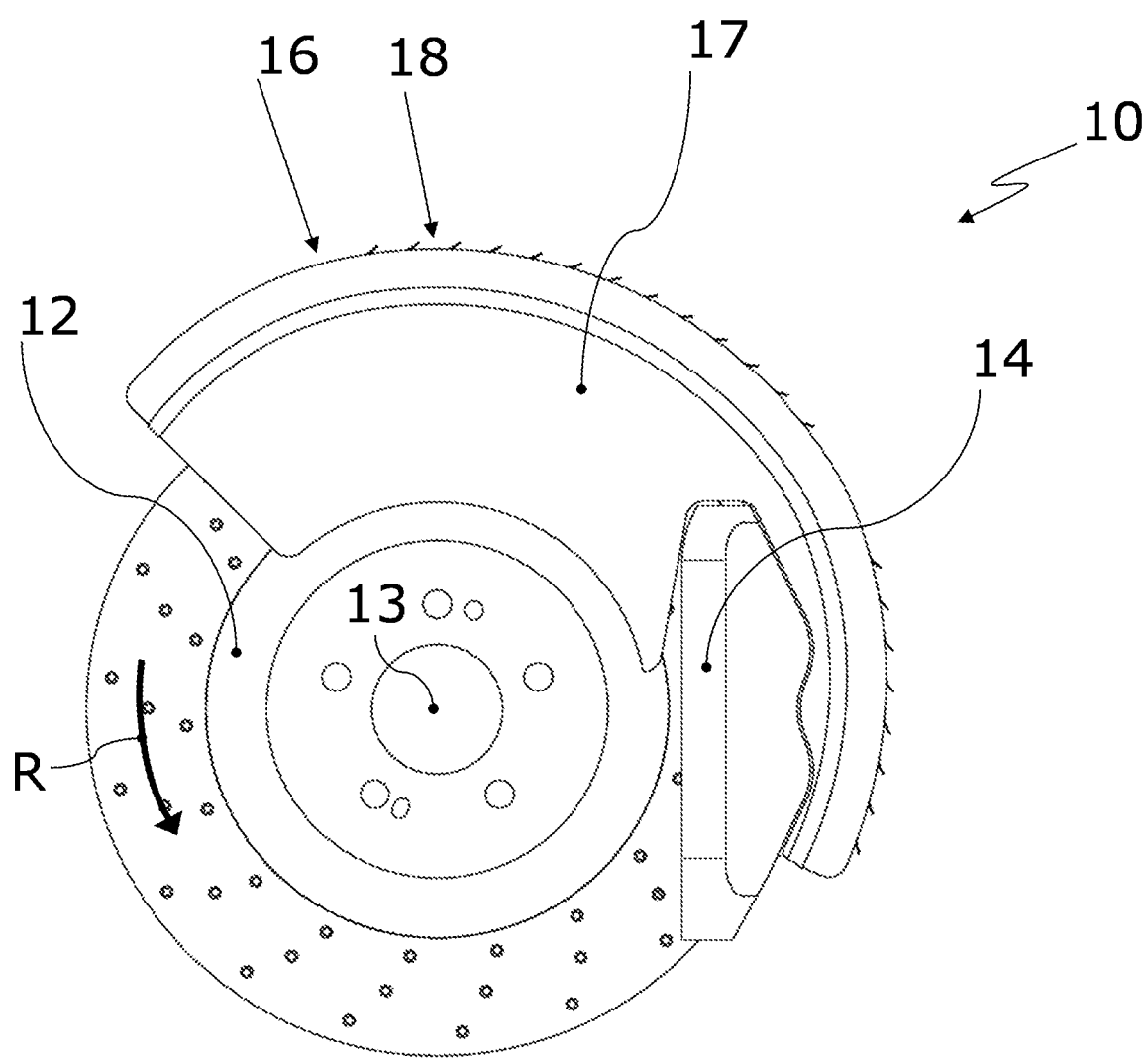
FIG. 1 shows a side view of a disc brake assembly according to the invention with a first embodiment of the brake dust particle filter.

FIG. 1 shows a side view of a disc brake assembly 10 with a disc brake 12 which comprises an axis of rotation or rotary axis 13, with a brake caliper 14 and a brake dust particle filter 16 in a first embodiment. In this context, the brake dust particle filter 16 is stationarily arranged in its position relative to the brake caliper 14 and/or attached to the brake caliper 14. Alternatively or additionally thereto, the disc brake assembly 10 can comprise moreover a wheel bearing housing (not illustrated) to which the brake caliper 14 is fastened, and the brake dust particle filter 16 can be stationarily arranged in its position relative to the wheel bearing housing and/or fastened to the wheel bearing housing. Alternatively or additionally thereto, the disc brake assembly 10 can comprise a splash guard (not illustrated) in the form of a splash guard plate, and the brake dust particle filter 16 can be arranged stationarily in its position relative to the splash guard and/or can be fastened to the splash guard.

The brake dust particle filter 16 comprises a first housing sidewall 17 which forms a part of a ring segment-shaped housing 18. A second housing sidewall 19 (see FIG. 2) is arranged spaced apart axially along the rotary axis 13 of the brake disc 12 relative to the first housing sidewall 17 and also forms a part of the ring segment-shaped housing 18, and between them the brake disc 12 is received in the housing interior.

The brake dust particle filter 16 can be arranged downstream of the brake caliper 14, in particular in rotation direction R of the brake disc 12 upon forward travel of a vehicle at which the disc brake assembly 10 can be arranged.

Figure 2:
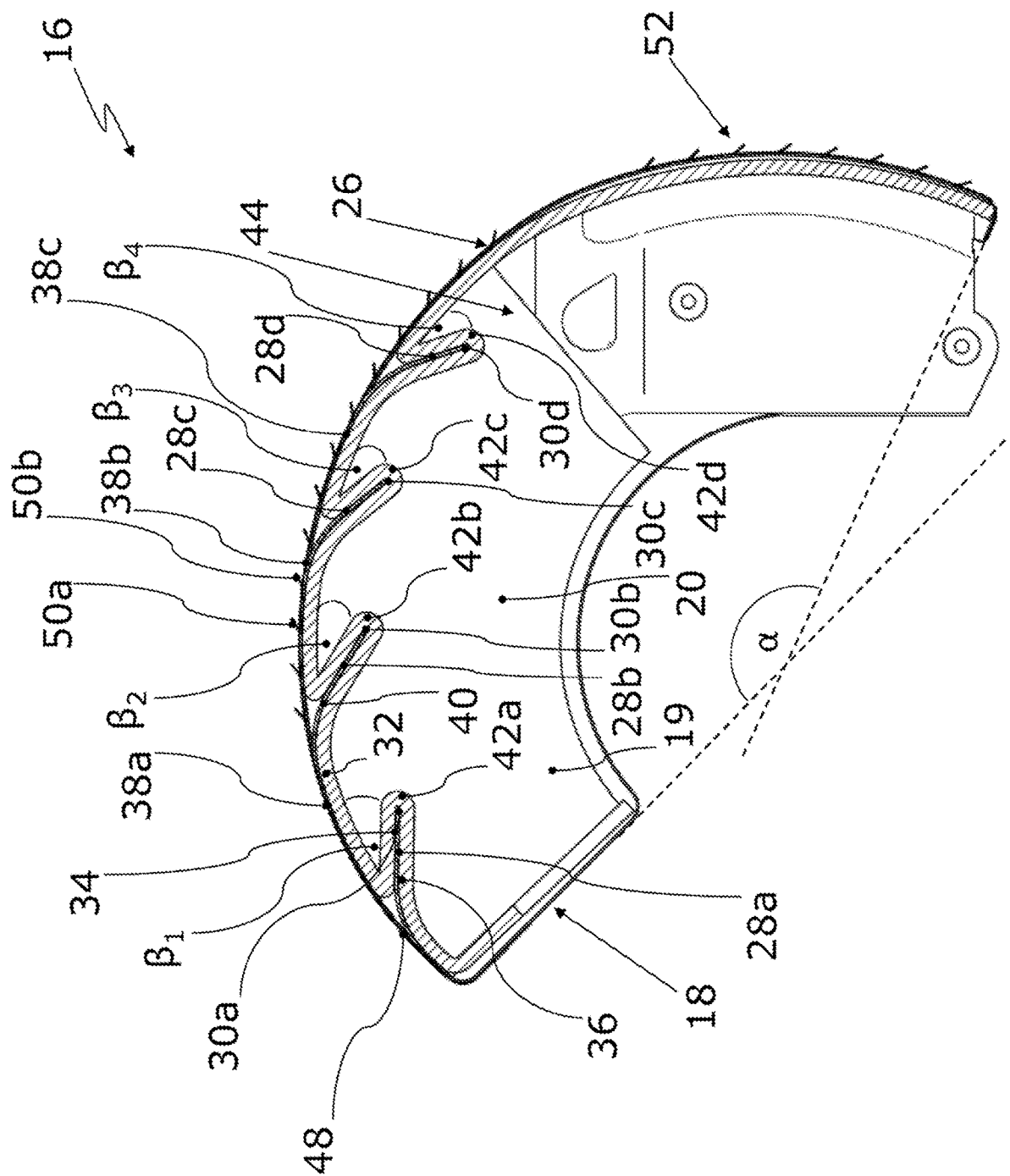
FIG. 2 shows a cross section of the brake dust particle filter according to FIG. 1.

In FIG. 2, a cross section of the brake dust particle filter 16 for filtering air that is provided with brake dust is illustrated. By means of the ring segment-shaped housing 18, the brake dust particle filter 16 can accommodate the brake disc 12 (see FIG. 1) at least partially in the housing interior 20. The ring segment-shaped housing 18 can extend about a ring segment angle α of more than 90° in this embodiment. The brake dust particle filter 16 is arranged flush at the brake caliper 14 (see FIG. 1) so that, when braking, air moved by the brake disc 12 (see FIG. 1) can flow from the brake caliper 14 into the brake dust particle filter 16.

The housing 18 comprises a housing peripheral wall 26 which extends radially outwardly in circumferential direction of the brake dust particle filter 16. The housing sidewalls 17, 19 (see FIG. 1) are connected to each other by the housing peripheral wall 26.

The brake dust particle filter 16 comprises moreover tongues 28a, 28b, 28c, 28d. These tongues 28a-28d are arranged at the housing peripheral wall 26 of the brake dust particle filter 16 or embodied as in FIG. 2. They project in the housing interior 20 of the brake dust particle filter 16 from the housing peripheral wall 26 inwardly. In this context, they are positioned relative to the housing peripheral wall 26 at an angle $\beta_1$, $\beta_2$, $\beta_3$, $\beta_4$, respectively. At these tongues 28a-28d, the air which flows into the brake dust particle filter 16 can be guided in the direction toward the housing peripheral wall 26. The tongues 28a-28d are oriented with their respective free ends 30a, 30b, 30c, 30d toward the brake caliper 14 (see FIG. 1).

A filter medium 32 for cleaning the air from particles is arranged at the tongues 28a-28d and covers the tongues 28a-28d. The filter medium 32 extends across the side of the respective tongue 28a-28d which is facing the housing peripheral wall 26 as well as across the side which is facing away from the housing peripheral wall 26 so that the tongues 28a-28d are covered by the filter medium 32, respectively. The filter medium is a continuous material strip which extends across all tongues 28a-28d as well as across the inner side of the housing peripheral wall 26 in the housing end region 52. In an exemplary fashion, the facing side is here identified at the tongue 28a by 34 and the side that is facing away by 36. The effective filter surface is thus enlarged by the tongues 28a-28d in circumferential direction of the housing interior 20. The filter medium 32 is moreover arranged at sections 38a, 38b, 38c of the housing peripheral wall 26 between the tongues 28a-28d. In this way, the filter medium 32 is connected immediately to the housing peripheral wall 26. In particular, it is attached to the housing peripheral wall 26 and/or to the tongues 28a-28d. Alternatively, it can be connected also indirectly to the wall of the housing 18 by means of further intermediate layers. The tongues 28a-28d can comprise one or a plurality of through openings (not shown) which are covered by the filter medium 32.

The tongues 28a-28d form a support structure 40 for the filter medium 32. For this purpose, the tongues 28a-28d project into folds 42a, 42b, 42c, 42d of the filter medium 32.

The filter medium 32 can comprise at least a first region and a second region (not shown). The first region can be embodied between the respective tongues 28a-28d and the second region. In this context, for coarse filtration the first region can comprise a larger porosity than the second region. The filter medium in addition can also comprise a third and/or further such regions of different porosities. As an alternative thereto, the transition from a larger porosity of the filter medium to a smaller porosity in the direction of the tongue 28a-28d can also be continuously realized (gradient).

In a further embodiment, the brake dust particle filter comprises, in addition to the filter medium 32, an additional filter medium (not illustrated). In this context, the filter medium 32 is arranged between the respective tongue 28a-28d and the additional filter medium. The additional filter medium comprises a larger porosity than the first filter medium. In an alternative embodiment, the brake dust particle filter 16 can comprise additional filter media with different porosity.

The brake dust particle filter 16 can be designed such that the filter action on the air moved in the circumferential direction by the brake disc 12 increases. For this purpose, the porosity of the filter medium 32 can decrease in circumferential direction of the housing, beginning at a bearing region 44 of the brake dust particle filter 16 provided for bearing against the brake caliper 14 (see FIG. 1). Alternatively or in addition thereto, the thickness of the filter medium 32 can increase in the circumferential direction of the housing 18, beginning at the bearing region 44 of the brake dust particle filter 16 provided for bearing against the brake caliper 14 (see FIG. 1). Alternatively or additionally thereto, a tongue 28a-28d can be positioned at a smaller angle $\beta_1$, $\beta_2$, $\beta_3$, $\beta_4$ relative to the housing peripheral wall 26 than a neighboring tongue 28a-28d which is located farther away from the aforementioned bearing region 44. Alternatively or additionally thereto, the free end 30a-30d of a tongue 28a-28d can project less far radially inwardly into the interior 20 of the housing 18 than a neighboring tongue 28a-28d which is located farther away from this bearing region 44. Alternatively or additionally thereto, the surface of at least one tongue 28a-28d that projects into the housing interior 20 can be smaller than the surface of a neighboring tongue 28a-28d which projects into the housing interior 20 and which is farther removed from this bearing region 44.

Figure 3:
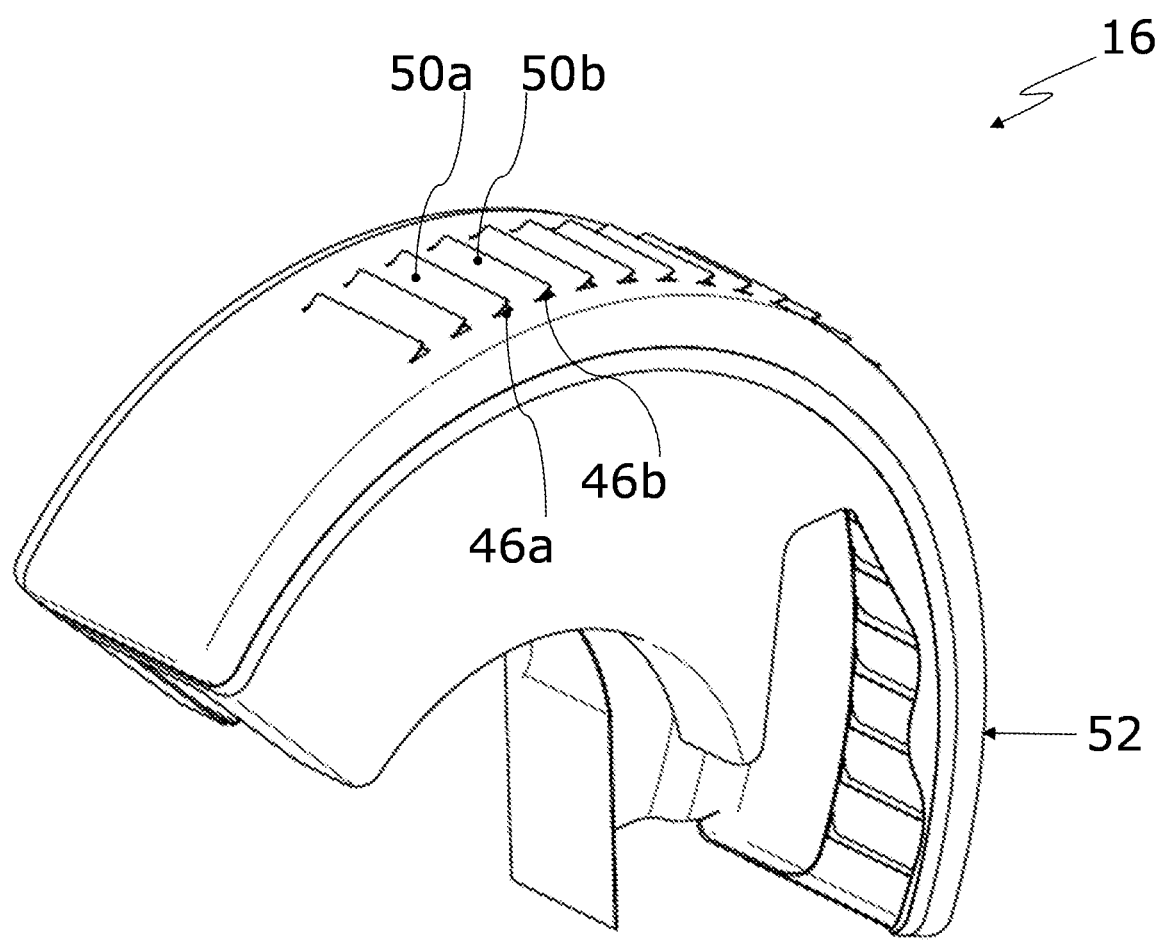
FIG. 3 shows an isometric view of the brake dust particle filter according to FIG. 1.

The brake dust particle filter 16 comprises in its housing peripheral wall 26 openings 46a, 46b (see FIG. 3). Through these openings 46a, 46b the purified air can escape to the exterior space. A part of the openings 46a, 46b is completely covered by the tongues 28a-28d covered by the filter medium 32 in the direction away from the housing interior 20 perpendicular to the circumferential direction of the brake dust particle filter 16. Another part of the openings 46a, 46b is covered only by the filter medium 32. In this way, it is ensured that as a whole only purified air can escape through the openings 46a, 46b to the exterior space.

Moreover, ribs are arranged and/or embodied outward at the housing peripheral wall 26 at the exterior side 48 and two of them are identified in an exemplary fashion by 50a, 50b. The ribs 50a, 50b are arranged at the openings 46a, 46b so that the air that escapes outwardly is guided by the ribs 50a, 50b in a desired direction. The ribs 50a, 50b prevent a flow through the filter medium from the clean side to the raw side by a dynamic pressure that is generated by the travel speed.

The brake dust particle filter 16 comprises a housing end region 52. The housing end region 52 can comprise at least partially the housing sidewalls 17, 19 and the housing peripheral wall 26. Also, it comprises the filter medium 32 arranged at the housing peripheral wall 26. Outwardly projecting ribs 50a, 50b and openings 46a, 46b in the housing peripheral wall 26 at the ribs 50a, 50b are also arranged and/or embodied in the housing end region 52. The housing peripheral wall 26 extends into the housing end region 52. The housing end region 52 covers in circumferential direction of the brake dust particle filter 16, beginning at the radial outer side of the brake dust particle filter 16, the brake caliper 14, in particular a gap 56 of the brake caliper 14 (see FIG. 4). The housing end region comprises for this purpose a cutout which can be matched to the respective shape of the brake caliper, here a brake caliper with at least two pistons.

FIG. 3 shows an isometric view of the brake dust particle filter 16. In particular, the outwardly oriented ribs 50a, 50b as well as the openings 46a, 46b can be seen. The housing 18 can be embodied as one part, i.e., one piece.

Figure 4:
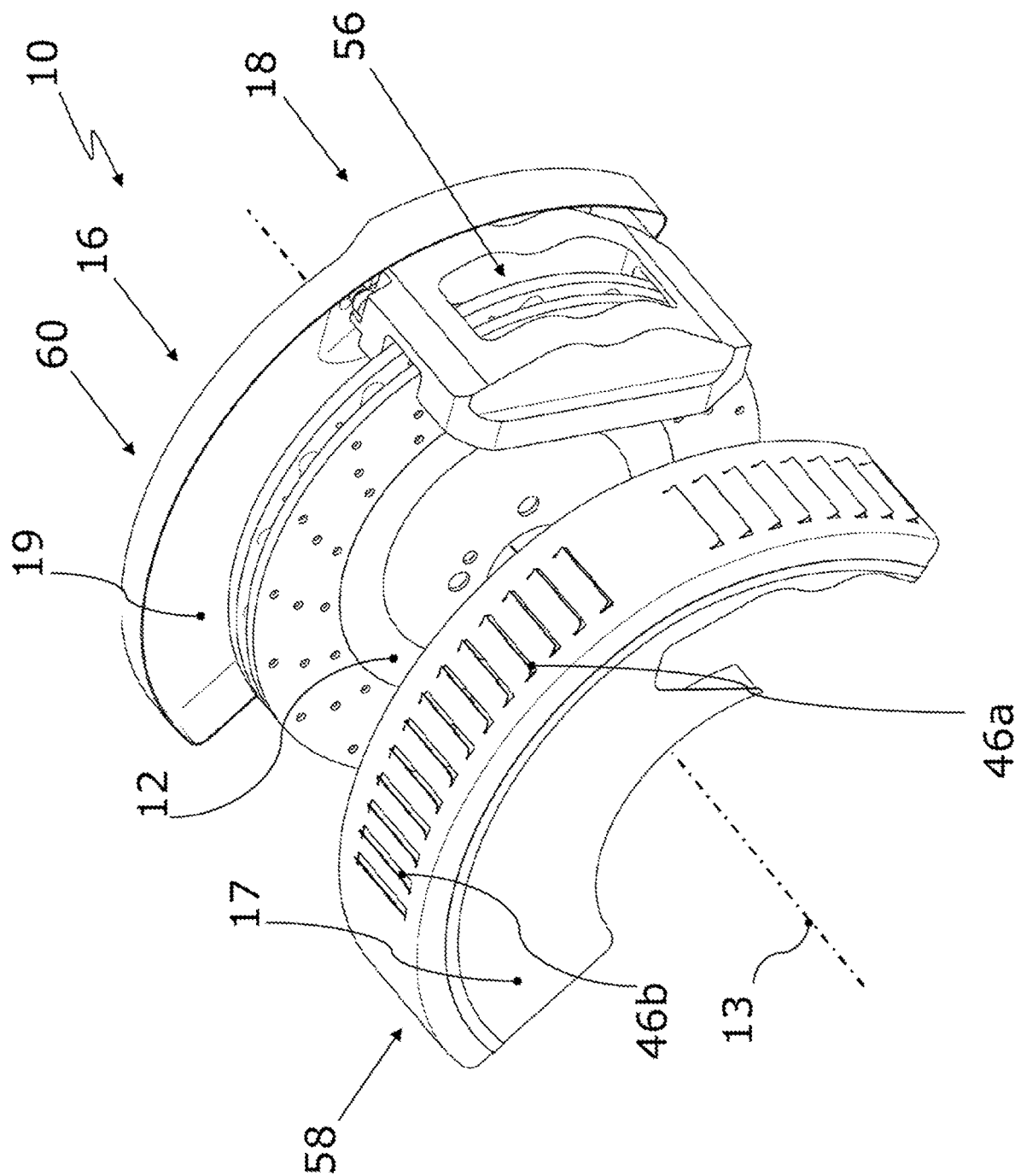
FIG. 4 shows an isometric view of a first housing part and of a second housing part of the housing of a brake dust particle filter in a second embodiment of the disc brake assembly.

As illustrated in FIG. 4, the housing 18 of the brake dust particle filter 16 in a second embodiment of the disc brake assembly 10 can comprise a first housing part 58 and a second housing part 60. The first housing part 58 comprises in this context the first housing sidewall 17. The second housing part 60 comprises the second housing sidewall 19 which is axially displaced relative to the first housing sidewall 17. Thus, the first housing sidewall 17 can be arranged axially displaced along the rotary axis 13 of the brake disc 12 relative to the brake disc 12 and the second housing sidewall 19 can be arranged at the side of the brake disc 12 facing away from the first housing sidewall 17. The first housing part 58 comprises openings 46a, 46b. The second housing part 60, in particular the second housing sidewall 19, can be embodied in the form of a splash guard plate so that, in case of doubt, a separate splash guard plate of the brake disc can be omitted, which is in particular of interest for OE applications.

Figure 5:
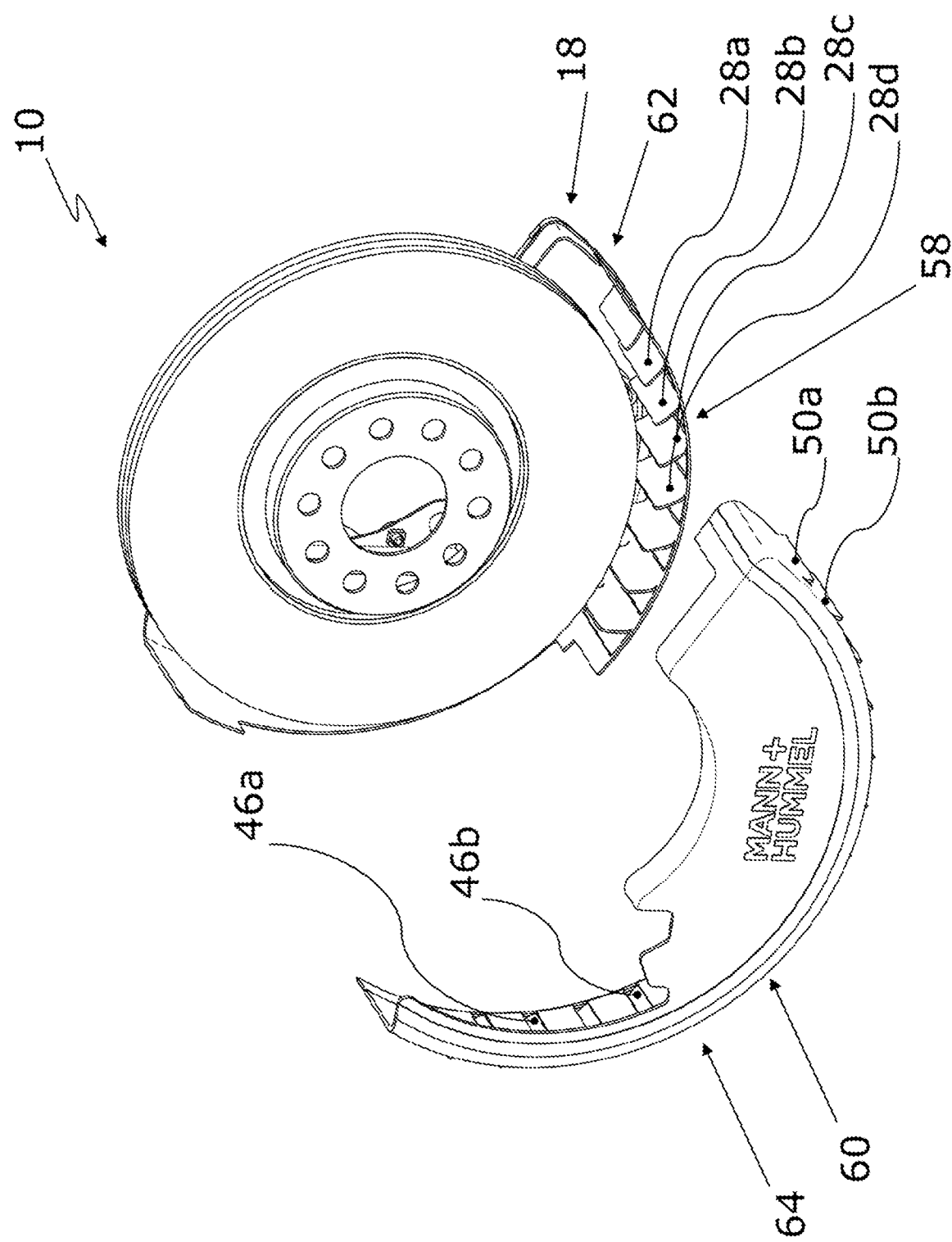
FIG. 5 shows an isometric view of the first housing part of the housing of the brake dust particle filter of a third embodiment of the disc brake assembly with inwardly projecting tongues and a second housing part with openings and outwardly projecting ribs.

As illustrated in FIG. 5, in a third embodiment of the disc brake assembly 10 the first housing part 58 of the housing 18 can comprise the inwardly projecting tongues 28a-28d. The second housing part 60 can comprise the openings 46a, 46b and the outwardly oriented ribs 50a, 50b. The inwardly projecting tongues 28a-28d can be formed by punching out of the housing peripheral wall 62 of the first housing part 58. The outwardly projecting ribs 50a, 50b can be embodied together with the openings 46a, 46b by punching out the ribs 50a, 50b out of the housing peripheral wall 64 of the second housing part 60. Punching out the ribs 50a, 50b and the tongues 28a-28d in circumferential direction of the brake dust particle filter 16 in the mounted state at the respective housing peripheral wall 62, 64 can be realized for each pair of associated tongues 28a-28d and ribs 50a, 50b at the same location. Then by pushing on the first housing part 58 onto the second housing part 60 it can be ensured in a simple way that the openings 46a, 46b are formed at the correct locations between a respective tongue 28a-28d and rib 50a, 50b, i.e., the openings 46a, 46b are positioned with precise fit above the intermediate spaces between the respective neighboring tongues 28a-28d.

The first housing part 58 and the second housing part 60 can be connected to each other. In particular, they are connectable reversibly to each other in order to be able to perform servicing work quickly. This connection can be realized inter alia by a screw connection of the brake dust particle filter. For this purpose, a housing part 58, 60 can comprise a thread at its outer side and the other housing part 58, 60 a thread at its inner side such that one housing part 58, 60 can be screwed onto the other housing part 58, 60. Alternatively or additionally thereto, the first housing part 58 and the second housing part 60 can be connected by a weld connection, a clip connection, and/or a crimped connection.

Figure 6:
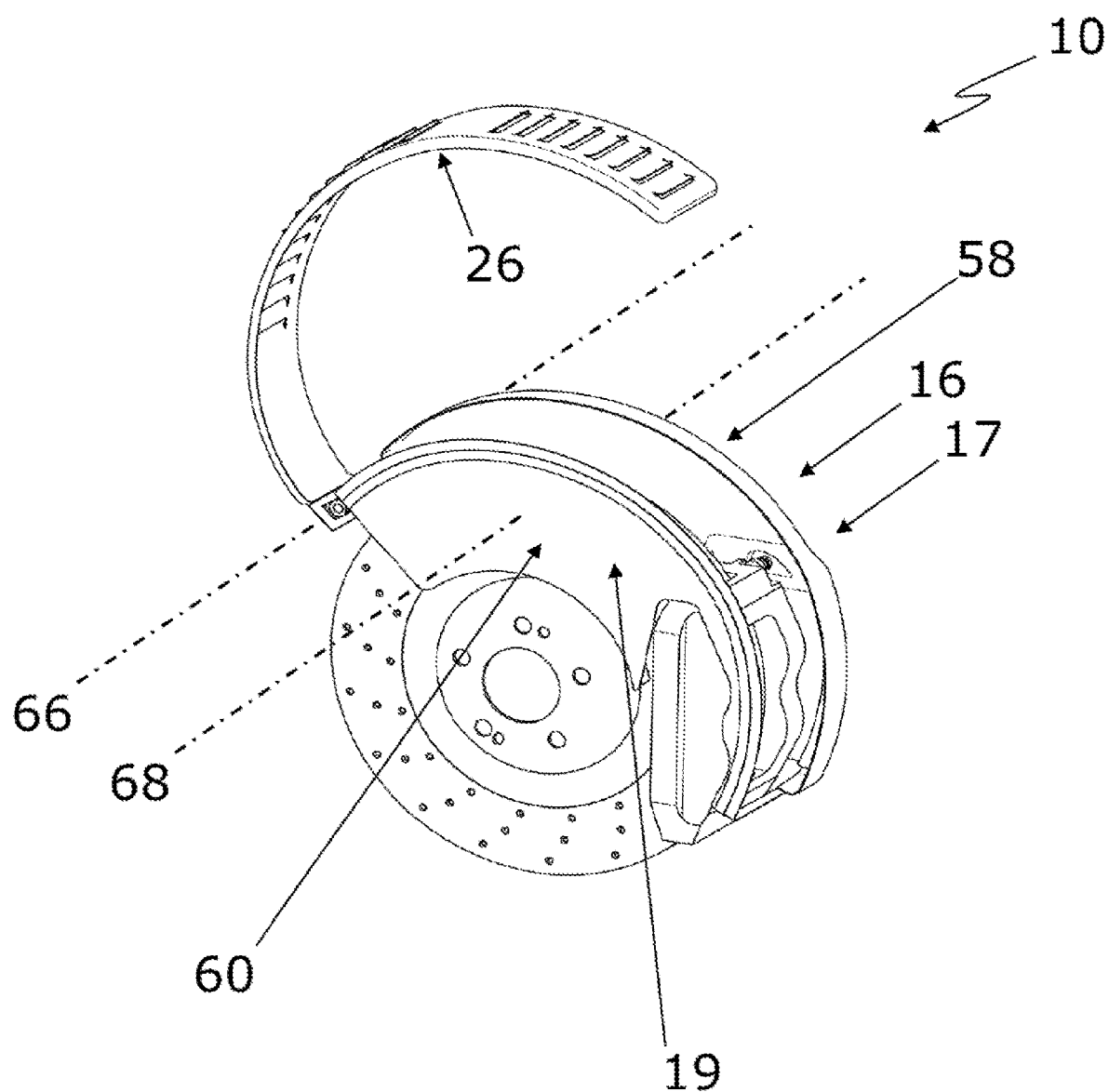
FIG. 6 shows an isometric view of the connection of a first housing part and of a second housing part of a fourth embodiment of the disc brake assembly by a pivot mechanism and/or a folding mechanism.

As illustrated in FIG. 6, in a fourth embodiment of the disc brake assembly 10, the first housing part 58 and the second housing part 60 can be connectable and/or are connected to each other by a pivot mechanism and/or a folding mechanism in order to be able to open and close again quickly the brake dust particle filter 16. The pivot axis 66 of the pivot mechanism can extend in this context parallel to an axis 68 which connects the two housing sidewalls 17, 19 or extends through them, and in this case extends additionally parallel to the axis of rotation of the brake disc. Then, the housing peripheral wall 26 can be pivoted relative to the two housing sidewalls 17, 19.

Figure 7:
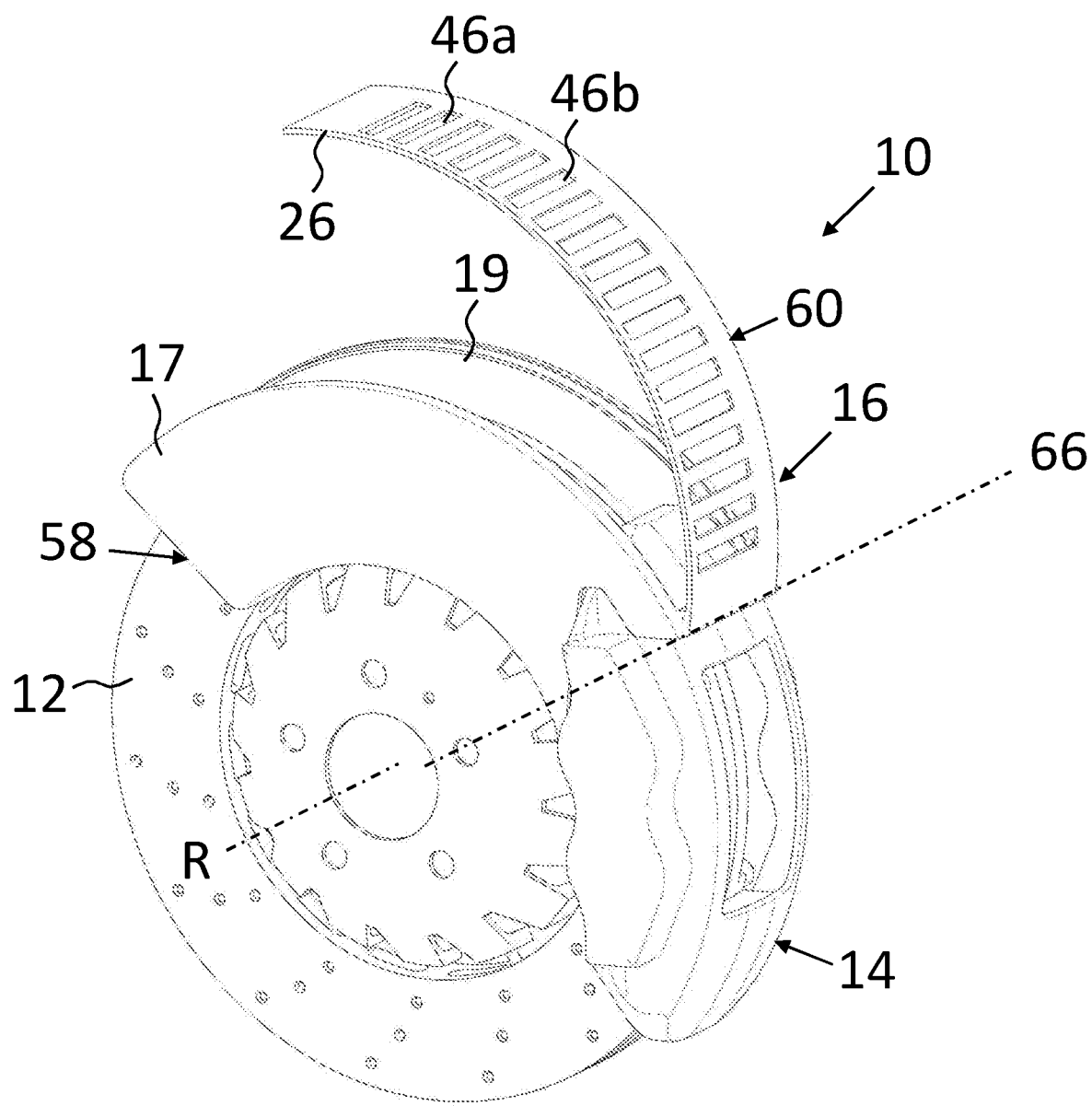
FIG. 7 shows an isometric view of the connection of the first housing part and of the second housing part by a pivot mechanism, wherein the pivot axis is present at an end of the housing that is facing the brake caliper.

In FIG. 7, a further embodiment of the disc brake assembly 10 according to the invention is illustrated whose brake dust particle filter 16 differs from the one illustrated in FIG. 6 in that the pivot axis 66 is present at an end of the housing 18 that is facing the brake caliper 14. This has the advantage that the pivot mechanism can be opened opposite to a predefined forward travel rotational direction of the disc brake assembly 10. This reduces the danger that the second housing part 60 with the housing peripheral wall 26 jams at the wheel rim in case of accidental opening.

The second housing part 60, which comprises the housing peripheral wall 26, is pivotable also according to this embodiment about the axis of rotation R of the brake disc 12 in order to be able to perform a comfortable service at the brake dust particle filter 16. A further difference to FIG. 6 resides in that the housing peripheral wall 26 in circumferential direction radially outwardly does not extend across the brake caliper 14 but adjoins it flush. This has the advantage that a radial size of the brake dust particle filter 16 is reduced so that also smaller rim inner diameters can be used with the disc brake assembly 10.

When reviewing all Figures of the drawing, the invention in summary concerns a brake dust particle filter 16 for a disc brake assembly 10 with a brake disc 12 and a caliper 14. The ring-segment shaped housing 18 of the brake dust particle filter 16 comprises a first housing part 58 and a second housing part 60. The first housing part comprises a first housing sidewall 17. The second housing part 60 comprises a second housing sidewall 19. The first housing part 58 and the second housing part 60 have an axial spacing relative to each other. The housing 18 comprises moreover a housing peripheral wall 26, 62, 64. The housing peripheral wall 26, 62, 64 is arranged or embodied radially outwardly in circumferential direction of the housing 18. In the mounted state, the housing peripheral wall 26 is arranged or embodied between the housing sidewalls 17, 19. The first housing sidewall 17 can be arranged axially displaced to the first side of the brake disc 12. The second housing sidewall 19 can be arranged on a second side of the brake disc 12 facing away from the first side. The housing 18 is designed such that in the mounted state it can at least partially accommodate the brake disc 12 in a housing interior 20. The brake dust particle filter 16 is configured for catching particles that are produced when braking.

What is claimed is:

1. A brake dust particle filter for a disc brake assembly with a brake disc and a brake caliper, wherein the brake dust particle filter is configured for catching particles produced when braking, the brake dust particle filter comprising:
    a ring segment-shaped housing comprising a housing interior and configured to accommodate, in a mounted state thereof, at least partially the brake disc in the housing interior;
    wherein the ring segment-shaped housing comprises housing walls, including a first housing sidewall and a second housing sidewall axially spaced apart from each other,
    wherein the housing walls further include a housing peripheral wall extending radially outwardly in a circumferential direction of the ring segment-shaped housing and arranged between the first and second housing sidewalls in the mounted state;
    wherein the ring segment-shaped housing comprises a first housing part comprising the first housing sidewall and/or the second housing sidewall and configured such that the first housing sidewall and/or the second housing sidewall are positionable axially displaced relative to the brake disc;
    wherein the ring segment-shaped housing comprises a second housing part comprising at least the housing peripheral wall;
    wherein the first housing part and the second housing part are connected to each other by a pivot mechanism comprising a pivot axis extending parallel to an axis of rotation of the brake disc in the mounted state and configured such that the housing peripheral wall is pivotable relative to the first housing part with the first housing sidewall and/or the second housing sidewall remaining stationary.

2. The brake dust particle filter according to claim 1, wherein
    the pivot axis is arranged at an end of the ring segment-shaped housing that, in the mounted state, faces the brake caliper such that the pivot mechanism is openable opposite to a predefined forward travel rotational direction of the disc brake assembly.

3. The brake dust particle filter according to claim 1, wherein
    the first housing part and the second housing part are connected to each other so as to be reversibly detachable.

4. The brake dust particle filter according to claim 1, wherein
    the housing peripheral wall is embodied at the first housing sidewall and/or at the second housing sidewall.

5. The brake dust particle filter according to claim 1, wherein
    the housing peripheral wall is embodied of the first and second housing parts that at least partially overlap each other.

6. The brake dust particle filter according to claim 1, wherein
    the first housing part and/or the second housing part is embodied as a splash guard.

7. The brake dust particle filter according to claim 6, wherein
    the splash guard is a splash guard plate.

8. The brake dust particle filter according to claim 1, wherein
    the first housing part is connected to the second housing part by a releasable connecting arrangement.

9. The brake dust particle filter according to claim 8, wherein
the releasable connecting arrangement connects the first housing part and the second housing part in an end position of the pivot mechanism.

10. The brake dust particle filter according to claim 9, wherein
the releasable connecting arrangement is a screw connection or a clip connection.

11. The brake dust particle filter according to claim 1, further comprising
at least one tongue arranged at the ring segment-shaped housing and projecting at least with sections thereof inwardly into the housing interior and
further comprising at least one filter medium,
wherein the at least one tongue supports the at least one filter medium and is covered at least partially with the filter medium.

12. The brake dust particle filter according to claim 11, wherein
the at least one tongue is arranged at one of the housing sidewalls so that the at least one filter medium is connected indirectly or directly to said one housing wall.

13. The brake dust particle filter according to claim 11, wherein
the at least one tongue is arranged at the housing peripheral wall so that the at least one filter medium is connected indirectly or directly to the housing peripheral wall.

14. The brake dust particle filter according to claim 11, further comprising
a filter element with a filter element support structure,
wherein the filter element includes the least one filter medium,
wherein the filter element support structure includes the at least one tongue, and
wherein the filter element is arranged in the ring segment-shaped housing.

15. The brake dust particle filter according to claim 14, wherein
the filter element is reversibly exchangeably arranged in the ring segment-shaped housing.

16. The brake dust particle filter according to claim 11, wherein
the at least one filter medium is fastened to one or more elements selected from the group consisting of the at least one tongue; the housing walls; and the filter element support structure.

17. The brake dust particle filter according to claim 11, wherein
the at least one filter medium forms a fold into which the at least one tongue projects at least partially.

18. The brake dust particle filter according to claim 11, wherein
the at least one tongue comprises one or more through openings covered by the at least one filter medium.

19. The brake dust particle filter according to claim 1, wherein
one of the housing walls comprises one or more openings for discharge of filtered air.

20. The brake dust particle filter according to claim 1, wherein
the housing peripheral wall comprises one or more openings for discharge of filtered air.

21. A disc brake assembly comprising the brake disc, the brake caliper, and the brake dust particle filter according to claim 1.

22. A disc brake assembly according to claim 21, wherein
the brake dust particle filter is arranged stationarily relative to the brake caliper or is fastened to the brake caliper.

23. The disc brake assembly according to claim 21, further comprising
a wheel bearing housing,
wherein the brake dust particle filter is stationarily arranged relative to the wheel bearing housing or is fastened to the wheel bearing housing.

24. The disc brake assembly according to claim 21, further comprising
a splash guard,
wherein the brake dust particle filter is stationarily arranged relative to the splash guard; is fastened to the splash guard; or the first housing part of the ring segment-shaped housing forms the splash guard.

25. The disc brake assembly according to claim 24, wherein
the splash guard is a splash guard plate.

* * * * *